United States Patent
Money et al.

(10) Patent No.: US 10,737,325 B2
(45) Date of Patent: Aug. 11, 2020

(54) ADDITIVE PRINTING METHOD

(71) Applicants: David Scot Money, Pipersville, PA (US); Christopher Smith, Newtown, PA (US)

(72) Inventors: David Scot Money, Pipersville, PA (US); Christopher Smith, Newtown, PA (US)

(73) Assignee: David Money, Pipersville, PA (US)

( * ) Notice: Subject to any disclaimer, the term of this patent is extended or adjusted under 35 U.S.C. 154(b) by 820 days.

(21) Appl. No.: 15/256,837

(22) Filed: Sep. 6, 2016

(65) Prior Publication Data

US 2018/0065182 A1 Mar. 8, 2018

(51) Int. Cl.
| | | |
|---|---|---|
| *B22F 3/105* | (2006.01) | |
| *B33Y 10/00* | (2015.01) | |
| *B22F 5/10* | (2006.01) | |
| *B29C 64/364* | (2017.01) | |
| *B29C 64/25* | (2017.01) | |
| *B29C 64/371* | (2017.01) | |
| *B29L 31/00* | (2006.01) | |
| *C22C 33/02* | (2006.01) | |

(Continued)

(52) U.S. Cl.
CPC .............. *B22F 3/1055* (2013.01); *B22F 5/10* (2013.01); *B29C 64/112* (2017.08); *B29C 64/20* (2017.08); *B29C 64/25* (2017.08); *B29C 64/364* (2017.08); *B29C 64/371* (2017.08); *B33Y 10/00* (2014.12); *B33Y 30/00* (2014.12); *B33Y 40/00* (2014.12); *B22F 3/1112* (2013.01); *B22F 2999/00* (2013.01); *B23K 2101/04* (2018.08); *B23K 2103/05* (2018.08); *B29C 64/106* (2017.08); *B29C 64/141* (2017.08); *B29C 2791/006* (2013.01); *B29K 2045/00* (2013.01); *B29L 2031/773* (2013.01); *B29L 2031/7734* (2013.01); *B33Y 80/00* (2014.12); *C22C 33/0285* (2013.01); *Y02P 10/295* (2015.11)

(58) Field of Classification Search
CPC .............................. A47J 41/022; B29C 64/364
See application file for complete search history.

(56) References Cited

U.S. PATENT DOCUMENTS

| | | | | |
|---|---|---|---|---|
| 4,059,764 A | * | 11/1977 | Belasco ..................... | G01J 5/28 250/352 |
| 5,192,598 A | * | 3/1993 | Forte ......................... | B32B 5/18 428/71 |

(Continued)

FOREIGN PATENT DOCUMENTS

EP 2837445 2/2015

OTHER PUBLICATIONS

"3D Printing in the Vaccuum of Space", https://3dprintingindustry.com/news/3d-printing-in-the-vacuum-of-space-now-possible-from-made-in-space-55309/, predates filing date.

*Primary Examiner* — Colleen P Dunn
*Assistant Examiner* — Sean P. O'Keefe
(74) *Attorney, Agent, or Firm* — Muskin and Farmer LLC

(57) ABSTRACT

A manufacturing method which manufactures articles which have hollow areas inside them which are subject to their own internal vacuum. A 3-D printer can be located inside a vacuum chamber and the article(s) can be 3-D printed, thereby the hollow area inside each such article is subject to its own vacuum. When removed from the vacuum chamber, the article's hollow area remains subject to its own internal vacuum.

7 Claims, 16 Drawing Sheets

(51) Int. Cl.
   *B22F 3/11*   (2006.01)
   *B33Y 40/00*   (2020.01)
   *B33Y 30/00*   (2015.01)
   *B29C 64/20*   (2017.01)
   *B29C 64/112*   (2017.01)
   *B23K 101/04*   (2006.01)
   *B23K 103/04*   (2006.01)
   *B29C 64/106*   (2017.01)
   *B29C 64/141*   (2017.01)
   *B29K 45/00*   (2006.01)
   *B33Y 80/00*   (2015.01)

(56) References Cited

U.S. PATENT DOCUMENTS

| | | | |
|---|---|---|---|
| 5,590,454 A | 1/1997 | Richardson | |
| 5,837,960 A * | 11/1998 | Lewis | B23K 26/34 219/121.63 |
| 6,363,606 B1 | 4/2002 | Johnson | |
| 7,008,209 B2 | 3/2006 | Iskra | |
| 7,722,348 B1 | 5/2010 | Quenneville | |
| 7,730,746 B1 | 6/2010 | Pavliscak | |
| 7,828,022 B2 | 11/2010 | Davidson | |
| 7,971,991 B2 | 7/2011 | Davidson | |
| 8,017,055 B2 | 9/2011 | Davidson | |
| 8,029,263 B1 | 10/2011 | Qyenneville | |
| 9,126,167 B2 | 9/2015 | Ljungblad | |
| 9,149,988 B2 | 10/2015 | Mark | |
| 9,156,205 B2 | 10/2015 | Mark | |
| 2002/0015654 A1* | 2/2002 | Das | B22F 3/1055 419/8 |
| 2015/0088295 A1* | 3/2015 | Hellestam | B22F 3/1055 700/118 |
| 2015/0128528 A1 | 5/2015 | Lacaze | |
| 2015/0137430 A1 | 5/2015 | Lyons | |
| 2015/0352789 A1 | 12/2015 | Hiader | |
| 2016/0194762 A1* | 7/2016 | Schaedler | C23C 26/00 428/220 |
| 2016/0199914 A1* | 7/2016 | Potter | F16L 59/065 419/7 |
| 2016/0368044 A1* | 12/2016 | Ciardullo | B22D 13/04 |
| 2017/0260865 A1* | 9/2017 | Schloffer | C30B 13/22 |

\* cited by examiner

ADDITIVE PRINTING METHOD

BACKGROUND OF THE INVENTION

Field of the Invention

The present general inventive concept is directed to a method, apparatus, and computer readable storage medium directed to a method and apparatus for three dimensional printing of enclosures subject to a vacuum.

Description of the Related Art

In some manufacturing fields, it is desirable to have objects manufactured which are subject to their own internal vacuum. For example, it is possible to manufacture an aluminum can and then have the contents to its own internal vacuum. This can be done by manufacturing the can, then inserting a tube inside (via a pumping port) the can and using a pump to pull all of the air out of the can and then sealing the pumping port where the tube was. This would result in the can being subject to an internal vacuum. The pumping port is an opening in the enclosure which is used to draw the air out of the enclosure (utilizing a pump or other air removal device) and then the pumping port (or port) must be sealed (e.g., glued shut) once the vacuum state is created.

Vacuum enclosures have be in use for years, as the insulating properties of a vacuum enclosure rivals any material insulation. Enclosures have been and are currently being used for insulating between extreme temperature difference, such as the difference between liquefied gases (N2, H2, He, Ar, etc.) and atmospheric temperature. A vacuum enclosure can keep liquefied gases from evaporating as fast as other non-vacuum enclosure apparatuses, due to the vacuum's lack of ability to transfer heat via convection, conduction, or radiative transmission.

Conventional vacuum enclosures are always built in a standard atmosphere, and built with a vacuum pump-out port, which gives the ability to evacuate the enclosure to the point of vacuum through the port, after the enclosure has been fully built. The pump-out port is then serviceable for future pumping in case of welding or manufacturing failure. Conventional enclosures are often welded stainless steel or aluminum, and checked for the possibility of molecular leaks with the use of helium mass spectrometry device.

While conventional enclosures are successful at enclosing the vacuum, or lack of matter, the inherent nature of the welded components, coupled with the need to evacuate matter (pump vacuum), create fail points for the vacuum enclosure that will eventually need repair. Conventional enclosures are limited in how small they can be manufactured, based on the size of the pumping port, as well as with other welding and manufacturing limitations.

SUMMARY OF THE INVENTION

It is an aspect of the present invention to provide an improved method of manufacturing enclosures subject to vacuum.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
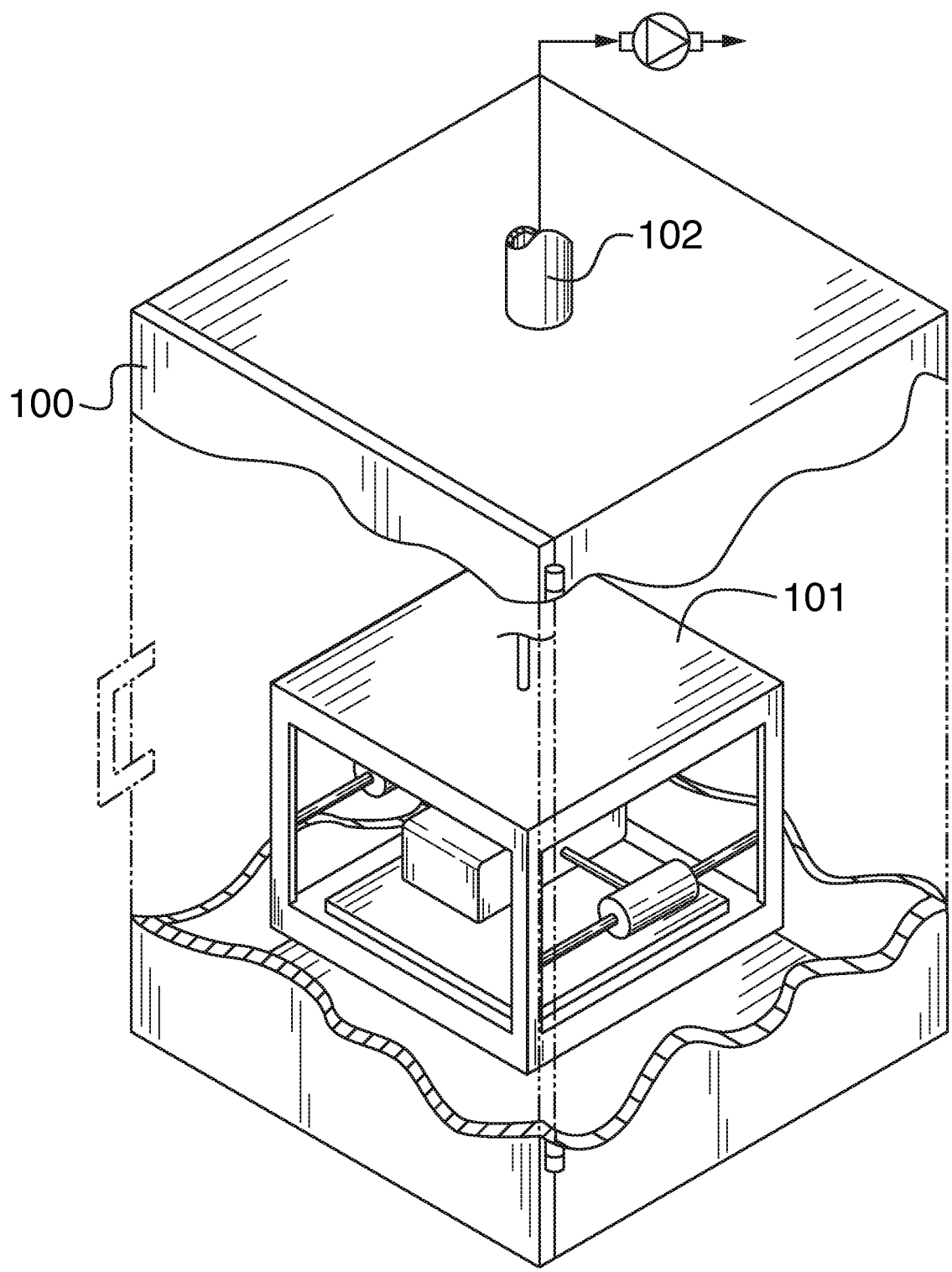
FIG. 1 is a drawing of a three dimensional printer in a vacuum chamber, according to an embodiment.

Reference will now be made in detail to the presently preferred embodiments of the invention, examples of which are illustrated in the accompanying drawings, wherein like reference numerals refer to like elements throughout.

The present inventive concept relates to a method for three dimensional printing of vacuum enclosures. An enclosure is an object with a hollow area inside which is fully enclosed by the object's surface. For example, a hollow sphere or hollow cube is an enclosure, as the hollow inside of the sphere or cube is fully self-contained and physically separated from the outside environment. A vacuum enclosure is such an enclosure wherein the hollow area inside is subject to a vacuum (meaning all air and other contents inside are the hollow area are removed thereby leaving a void (or vacuum) inside the enclosure).

A vacuum enclosure can be 3-D printed using a three dimensional printer located inside a vacuum chamber (wherein the vacuum chamber is powered on and hence everything inside the vacuum chamber is subject to a vacuum). Thus, the inside (hollow area) of the vacuum enclosure would be subject to a vacuum. Once the vacuum enclosure is fully printed (and hence enclosed), the vacuum enclosure can be removed from the vacuum chamber and the hollow area therein will remain in a vacuum state.

Thus, this eliminates the need to evacuate matter from the enclosure after it is manufactured, as according to the inventive concept the vacuum state of the enclosure is created during the manufacture of the enclosure.

For example, a hollow sphere can be completely printed by a three-dimensional printer inside a vacuum chamber. The hollow sphere (a vacuum enclosure) is now subject to its own vacuum and no vacuum plug or post-manufacture process is needed now to create a vacuum inside the sphere.

One advantage of the present inventive concept is that pumping ports are not required to achieve the same vacuum environment in a manufactured enclosure, which eliminates a failure point, and gives the ability to scale to a much smaller scale than current manufacturing processes.

One application for the present invention for providing insulators with a relatively high R-value, which a measure of thermal resistance (an insulating factor). Hollow objects that have their own internal vacuum may have a higher R-value than if they were not subject to their own internal vacuum. Therefore, in one embodiment, objects described herein can be used for insulating purposes.

FIG. 1 is a drawing of a three dimensional printer in a vacuum chamber, according to an embodiment.

FIG. 1 is a drawing of a three dimensional printer in a vacuum chamber, according to an embodiment;

A vacuum chamber 100 is a large chamber which can house a three-dimensional printer 101 (also referred to as additive printer). Three dimensional printers are known in the art and can print using materials such as nylon, ABS, PLA, LayWood, etc. Three dimensional printers can also print using metals and metal composites, such as stainless steel, gold, silver, titanium, aluminum, cobalt, etc.

Inside the three-dimensional printer 101 is an enclosure in the process of being printed. The vacuum chamber 100 is powered on and generates a vacuum environment inside the entire vacuum chamber. An opening 102 is used to continuously pump air and all other particles outside of the vacuum chamber 100. The vacuum chamber 100 is airtight and has no other opening other than opening 102.

Figure 2A:
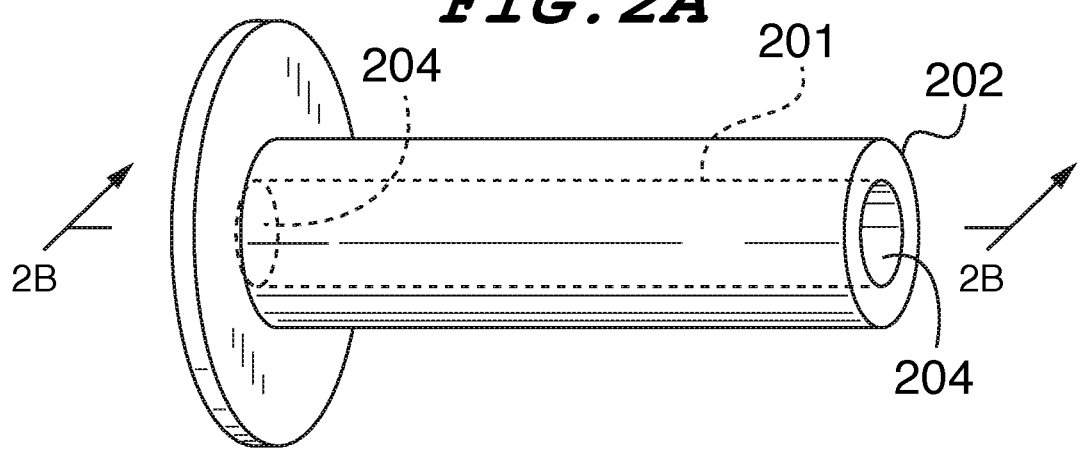
FIG. 2A is a drawing of a bayonet shaped enclosure, according to an embodiment.

FIG. 2A is a drawing of a bayonet shaped enclosure, according to an embodiment;

A bayonet shaped enclosure has two cylinders, an inner cylinder 201 and an outer cylinder 202. A hollow area 203 (see FIG. 2B) inside the enclosure between the inner cylinder 201 and outer cylinder 202 is completely enclosed and sealed off from the outside environment and therefore can be subject to a vacuum when 3-D printed according to the methods described herein. The bayonet has a hollow opening 204 though which passes through both ends of the bayonet and of course cannot be subject to a vacuum since it is open at both ends.

Figure 2B:
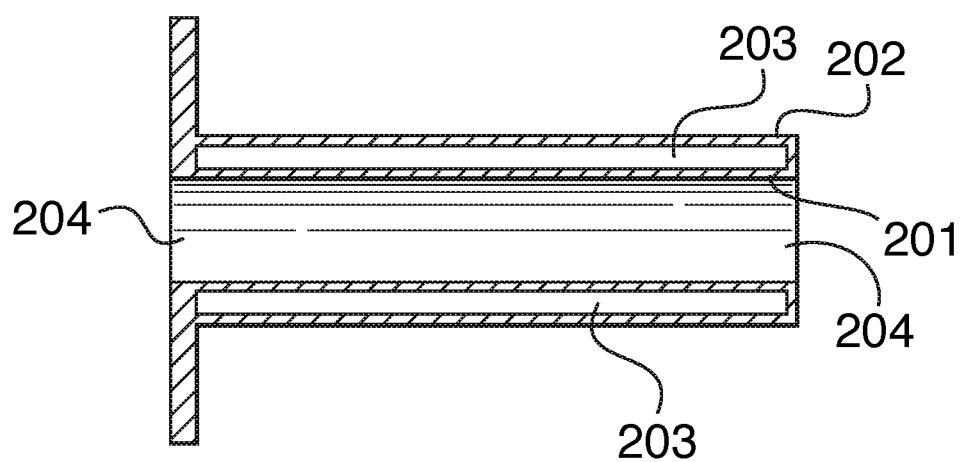
FIG. 2B is a cross sectional view from the section plane shown in FIG. 2A, according to an embodiment.

FIG. 2B is a cross sectional view from the section plane shown in FIG. 2A, according to an embodiment;

Shown is the inner cylinder 201, outer cylinder, 202, hollow area 203 between the inner cylinder 201 and the outer cylinder 202. The hollow opening 204 also passes through the entire bayonet which is not enclosed.

Figure 3A:
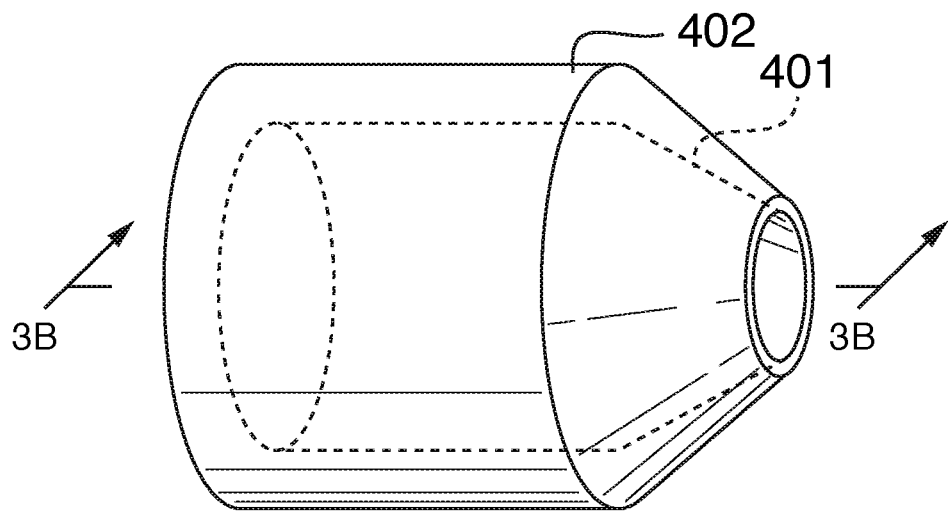
FIG. 3A is drawing of a dewar shaped enclosure, according to an embodiment.

FIG. 3A is drawing of a dewar shaped enclosure, according to an embodiment;

A dewar shaped enclosure comprises two surfaces, an inner wall 401 and an outer wall 402. The hollow area 403 (see FIG. 3B) inside the enclosure between the inner wall 401 and the outer wall 402 is completely sealed off from the outside environment and therefore can be subject to a vacuum when 3-D printed according to the methods described herein. An opening 404 is open to the outside world, much like the inside of a cup would be open.

Figure 3B:
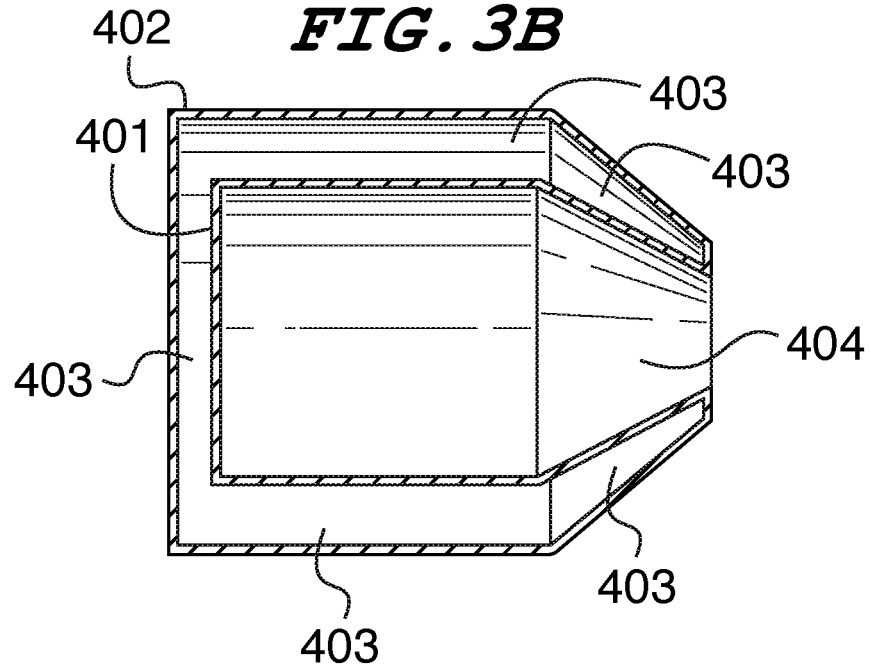
FIG. 3B is a cross sectional view from the section plane shown in FIG. 3A, according

FIG. 3B is a cross sectional view from the section plane shown in FIG. 3A, according Shown is the inner wall 401, outer wall 402, and hollow area 403, opening 404.

3D additive printing (three dimensional printing) in a vacuum environment allows for the opportunity to create very small vacuum enclosures, leading the way for insulating apparatuses of a small nature, such as a closed cell insulation material with vacuum environments in each of the closed cells.

Closed cell polyurethane foam is a typical material to use for insulating many residential and commercial applications.

Closed cell foam is made up of many small 'cells' of foam, each containing its own atmosphere, most likely plain air (depending on where it was created). These self-contained pockets of atmosphere provide an insulation factor when coupled with many other similar cells grouped together.

Closed cell polyurethane foam is dependent on the atmosphere to hold the cell walls together. When closed cell polyurethane foam is subjected to a vacuum environment, the foam disintegrates to a powder. A stronger material, such as stainless steel or phenolic plastic, would have the strength to hold its shape in, and containing, a vacuum environment.

Through the methodology of the present invention of 3D additive printing in a vacuum, a similar foam-like structure, manufactured with stronger materials such as stainless steel or phenolic plastic, would be superior in insulating value due to its removal of additional heat transfer through convection through the atmosphere in the cells, as well as superior in strength than other forms of closed cell foam.

Figure 4A:
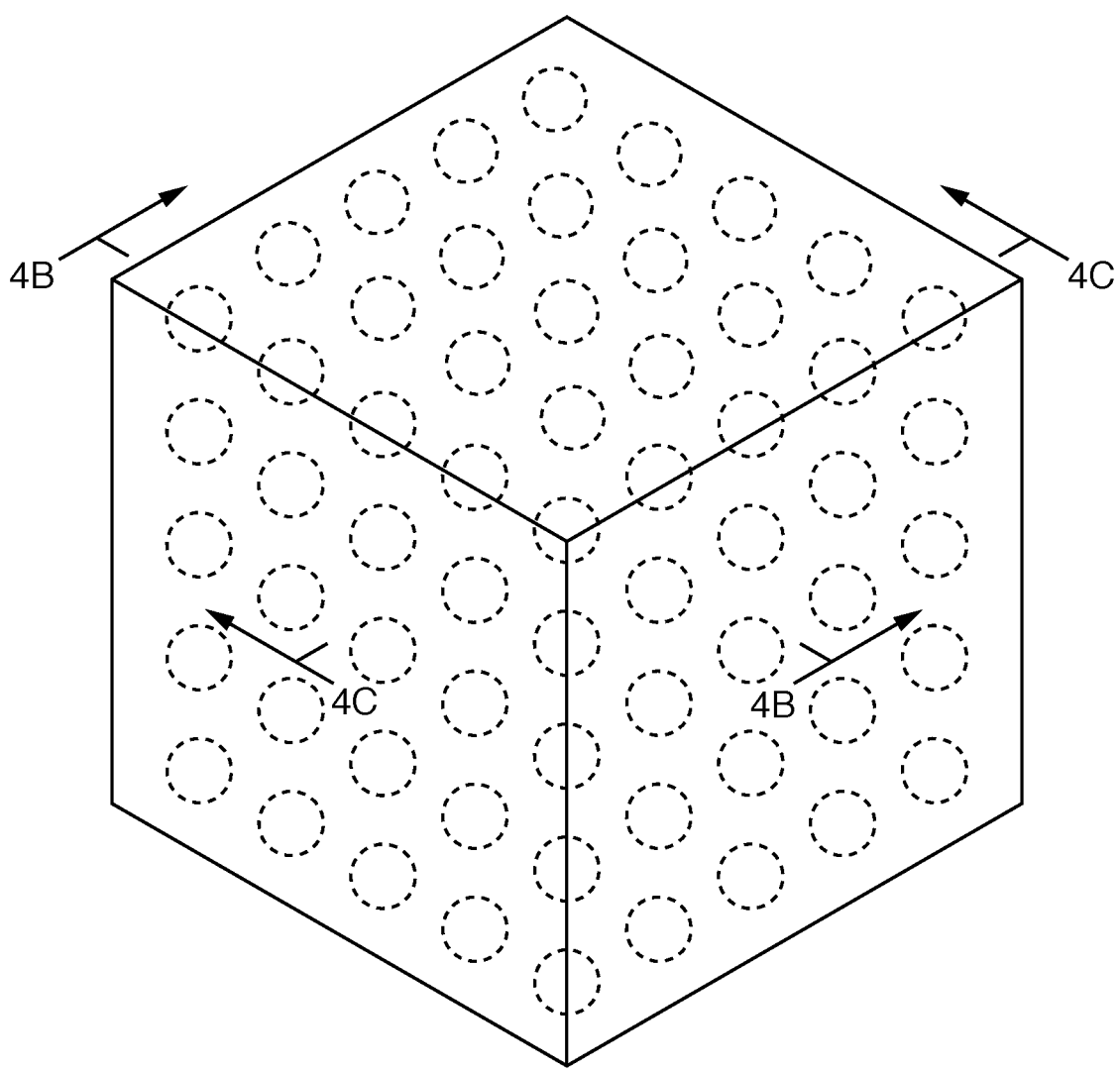
FIG. 4A is a drawing of printed insulated foam material, according to an embodiment.
Figure 4B:
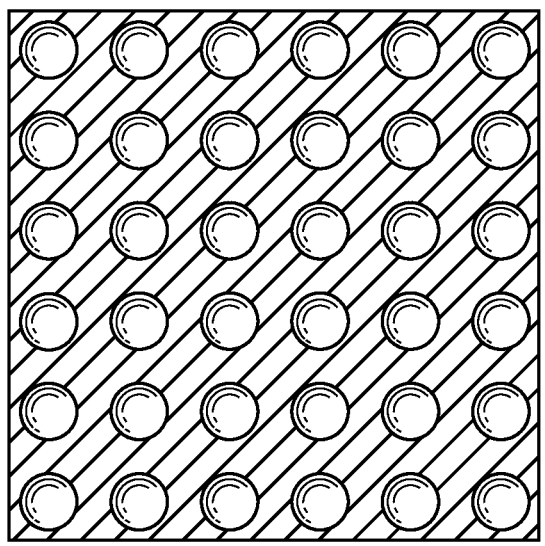
FIG. 4B is a cross sectional view from the section plane shown in FIG. 4A marked '4B', according to an embodiment.
Figure 4C:
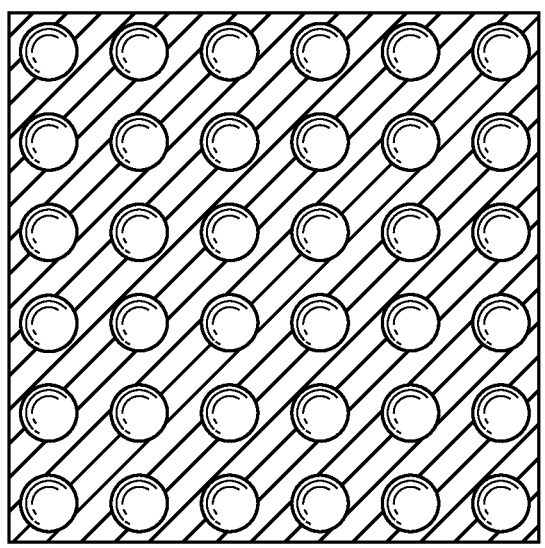
FIG. 4C is a cross sectional view from the section plane shown in FIG. 4A marked '4C', according to an embodiment.

FIG. 4A is a drawing of printed insulated foam material, according to an embodiment. FIG. 4B is a cross sectional view from the section plane shown in FIG. 4A marked '4B', according to an embodiment. FIG. 4C is a cross sectional view from the section plane shown in FIG. 4A marked '4C', according to an embodiment.

Shown is closed cell foam which has many smaller holes, each self-enclosed and printed inside a vacuum chamber thus subject to its own internal vacuum. Note that there are some half-formed holes and the edges which of course cannot be subject to their own vacuum since they are not entirely enclosed. While the external surface is shown, note that the pattern of spheres continues throughout the inside of the foam as well. The entire article is printed by the 3-D printed all at once.

Such a foam can desirable insulations properties as opposed to standard types of foam (or other materials). The vacuum spheres inside the foam may restrict thermal conductivity more effectively than if the vacuum was not present.

While the word "foam" is used, the material utilized is not limited to foam and any other suitable material (e.g., stainless steel, phenol plastic, nylon, or any other material that can be 3-D printed) can be utilized to print the article with the structure as illustrated in FIG. 4A.

FIG. 4A shows a cube (although the foam can come in any shape) with a 5×5×5 layout of spheres (actually hollow spheres) inside, all spheres are of equal size and equally spaced (for a total of 125 spheres total). Although in another embodiment, the spheres can be of varying size and not equally spaced. In a further embodiment, in is not necessary to use spheres as the hollow areas, and other hollow shapes can be used as well, such as cubes, cuboids, cones, cylinders, ect.

FIGS. 4B and 4C show a cross sectional view inside the cube shown in FIG. 4A (from the planes marked '4B' and '4C' respectively). This shows that all of the spheres are of equal sized and equally spaces in all dimensions.

In an embodiment, the vacuum state does not need to be maintained during the entire printing of the enclosure. Most of the enclosure can be printed in a non-vacuum state with a hole remaining. Then the vacuum state can be initiated inside the vacuum chamber, and then the hole can be printed in. As such, the enclosure would be subject to a vacuum state as if the vacuum state was maintained the entire time the enclosure was being printed.

Figure 5:
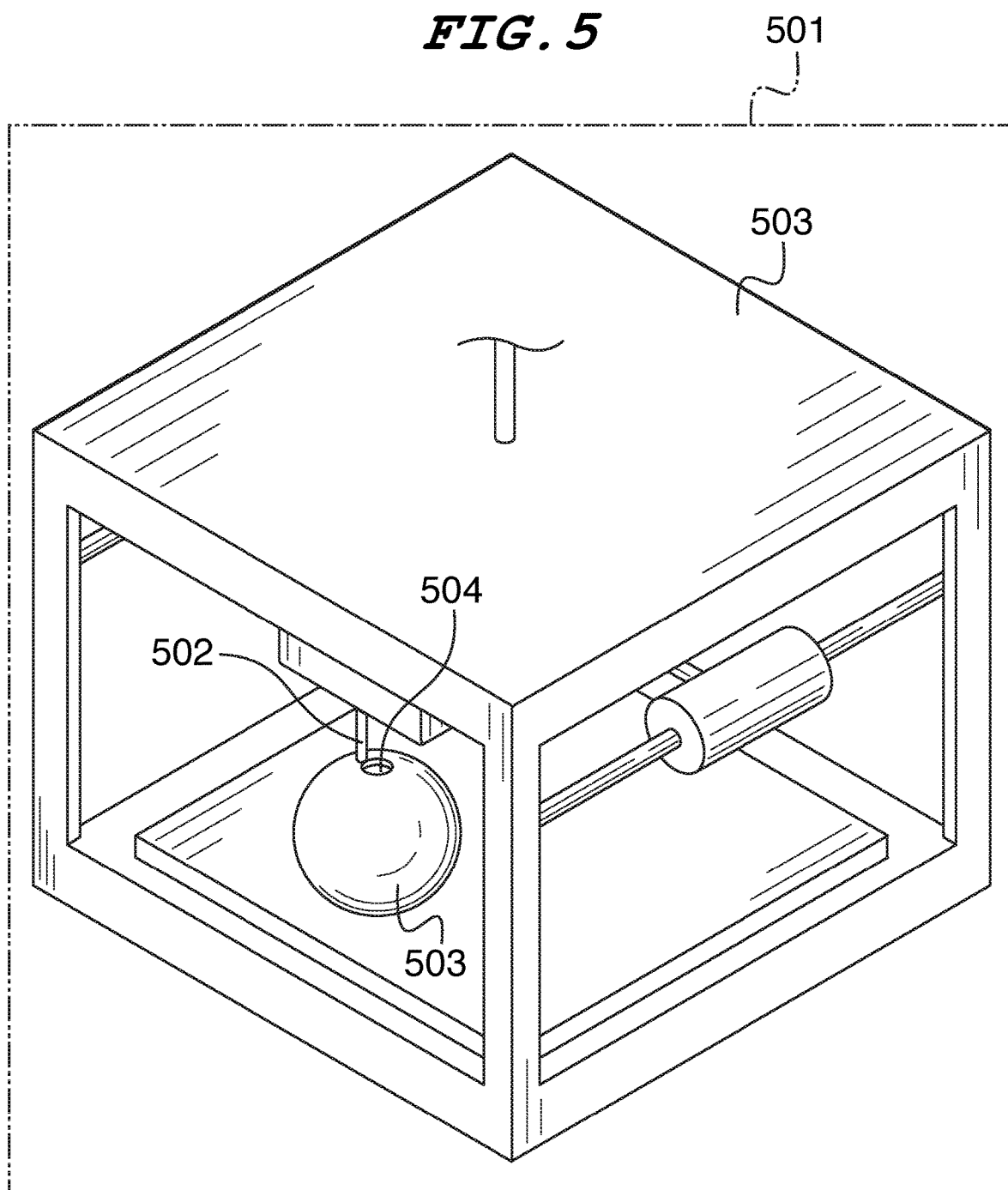
FIG. 5 is a drawing of a 3-D printer inside a vacuum chamber printing a hollow sphere with a hole, according to an embodiment.

FIG. 5 is a drawing of a 3-D printer inside a vacuum chamber printing a hollow sphere with a hole, according to an embodiment.

A 3-D printer is shown inside a vacuum chamber 501. A printer head 502 prints most of the enclosure 503 but for a hole 504. The hole 504 can be any size (such as 0.1 inch diameter, or any other size). The vacuum chamber 501 does not need to be in a vacuum state during this printing.

After the enclosure 503 with the hole 504 is printed, the vacuum chamber can now be turned on and a vacuum state is induced inside the vacuum chamber (of course the entire vacuum chamber which is hermetically sealed to the outside). The 3-D printer can now complete the enclosure as shown in FIG. 6 by printing a remainder 505 which is the rest of the enclosure 503 which will complete the enclosure which separates the hollow area inside the enclosure from the outside world (e.g., the inside of the sphere is now subject to its own vacuum and hermetically sealed off from the outside).

Figure 6:
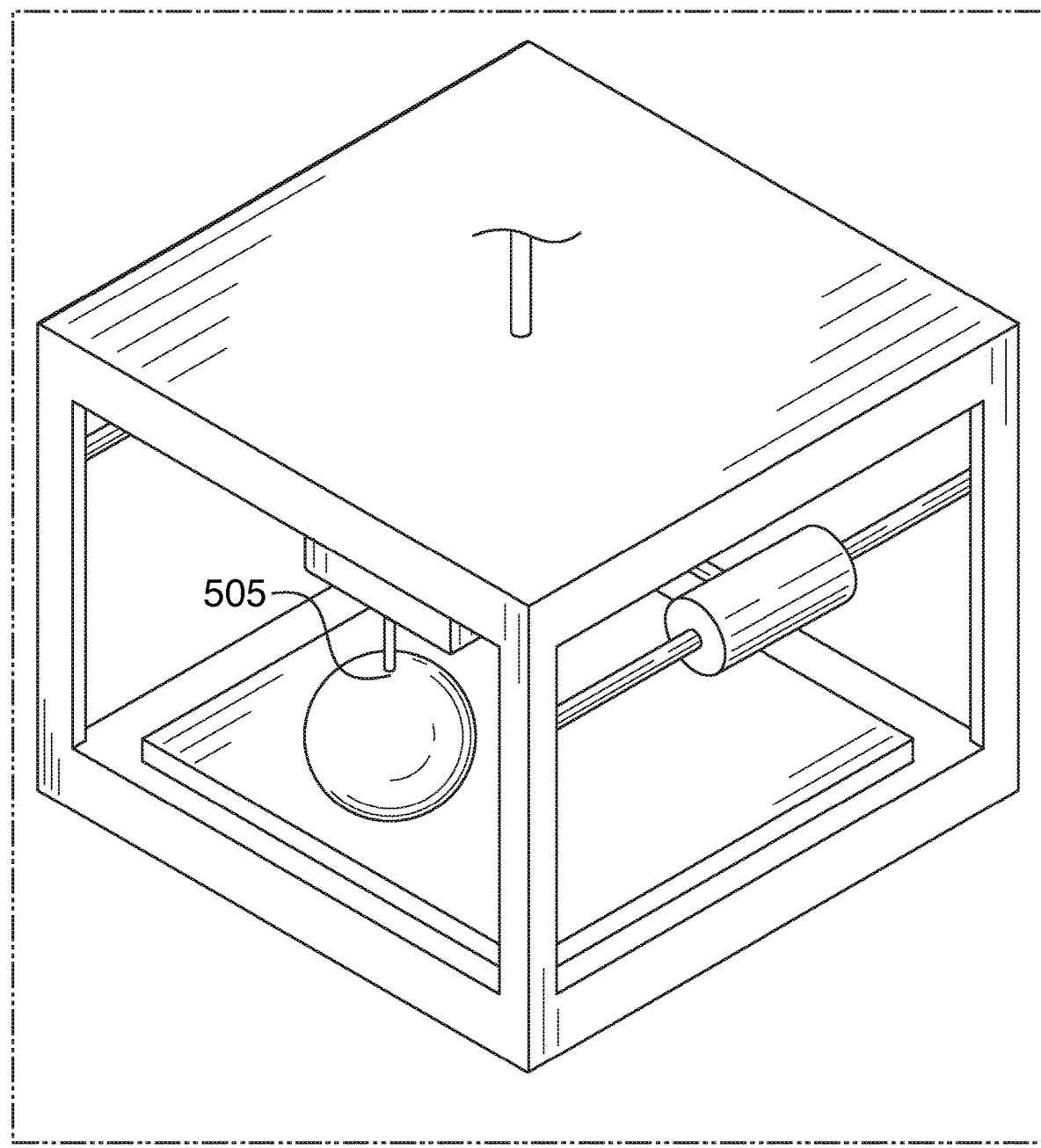
FIG. 6 is a drawing of the 3-D printer inside a vacuum chamber after the hole is printed by the printer, according to an embodiment.

FIG. 6 is a drawing of the 3-D printer inside a vacuum chamber after the hole is printed by the printer, according to an embodiment.

The vacuum chamber is turned on and there is a vacuum state inside the vacuum chamber (and hence inside the 3-D printer as well). The remainder 505 is printed which fills in the hole 504 (from FIG. 5) by the printer head 502 and the enclosure 503 is now completed. Since the vacuum chamber is subject to a vacuum, the contents of the enclosure 503 is now subject to a vacuum as well.

The technique of printing a mostly-complete article while not in the vacuum state and then initiating the vacuum and completing the article can be referred to as "timed vacuum induced printing" since the vacuum state is induced at a particular time (when the article is mostly complete but for a small hole). In alternative embodiment, instead of a single hole that has to be filled in, multiple holes (or areas) would be left open that need to be filled in once the vacuum state is initiated inside the vacuum chamber.

In a further embodiment, the timed vacuum inducted printing method can be utilized to print a multi-layered article (for example the article illustrated in FIGS. 4A, 4B, 4C). This can be accomplished by printing a first layer (but for the holes on top of each hollow area) while not in a vacuum state, then inducing the vacuum state and completing the first layer (by printing in the holes on each hollow area). This would complete a first layer. Then, the vacuum can be turned off and a second layer can be printed (but for the holes on top of each hollow area) while not in a vacuum state. Then, the vacuum state can be induced and the second layer can be completed (by printing in the holes in each hollow area for the second layer). This process can be repeated for as many layers as the article has (any number of layers can be printed using this technique). This process is illustrated in FIGS. 7-10 (all in temporal order).

Figure 7:
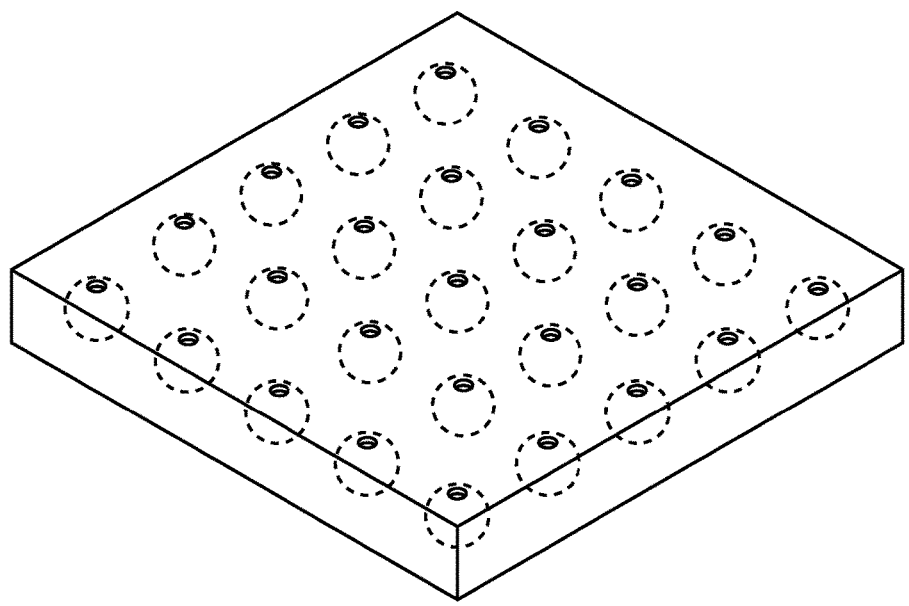
FIG. 7 is a drawing of a first layer of layered material printed with a hole on top of each hollow area, according to an embodiment.

FIG. 7 is a drawing of a first layer of layered material printed with a hole on top of each hollow area, according to an embodiment.

The bottom layer is printed while not in a vacuum state. The bottom layer is the grid of 5 by 5 hollow spheres with a hole on top.

Figure 8:
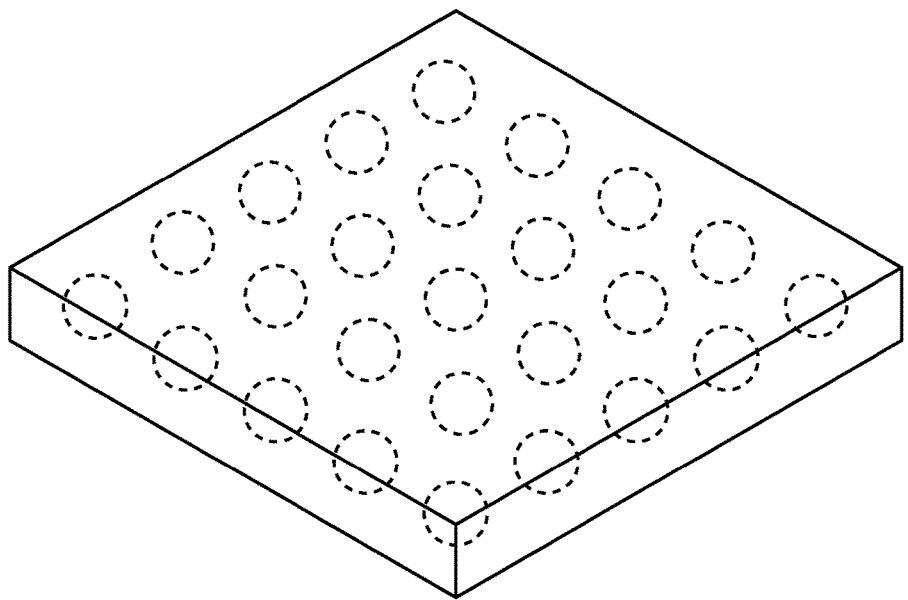
FIG. 8 is a drawing of the first layer of layered material printed with the hole on top of each hollow area printed in, according to an embodiment.

FIG. 8 is a drawing of the first layer of layered material printed with the hole on top of each hollow area is printed in, according to an embodiment.

Now, the vacuum state inside the vacuum chamber (and hence the 3-D printer inside the vacuum chamber) is induced (e.g., by powering on the vacuum pump or initiating any such machinery to activate the vacuum chamber) and the top hole of each hollow area (the hollow sphere) is printed in. Note that whenever the vacuum state is inducted, a sufficient amount of time must be waited after the vacuum chamber is activated in order that the adequate vacuum state is present (this may take a short time, such as one second or any other amount of time). A sensor can be present inside the vacuum chamber to detect the amount of vacuum present (e.g., air particles) and after the number of particles is determined to be below a certain threshold then the vacuum state is considered adequate and the printing can begin (or resume).

After the top of each hollow sphere is printed as in FIG. 8, the vacuum chamber can be deactivated, thereby removing the vacuum state inside the vacuum chamber and the second layer can be printed.

Figure 9:
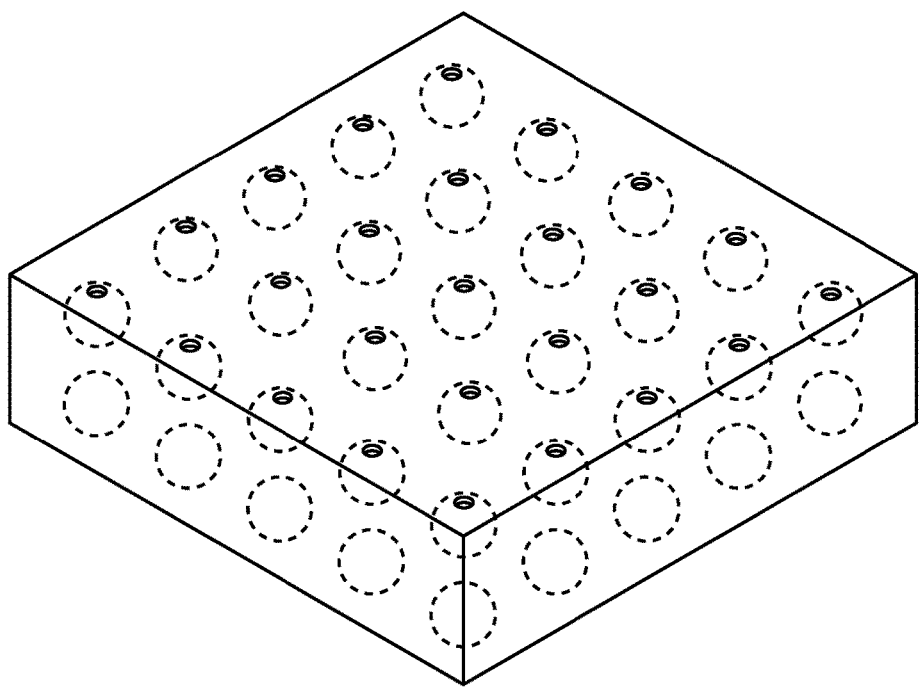
FIG. 9 is a drawing of a second layer of layered material printed over the first layer, the second layer printed with a hole on top of each hollow area, according to an embodiment.

FIG. 9 is a drawing of a second layer of layered material printed over the first layer, the second layer printed with a hole on top of each hollow area, according to an embodiment.

While not in a vacuum state, the second layer of hollow spheres is printed with the opening (hole) on top.

Now, the vacuum state can be induced.

Figure 10:
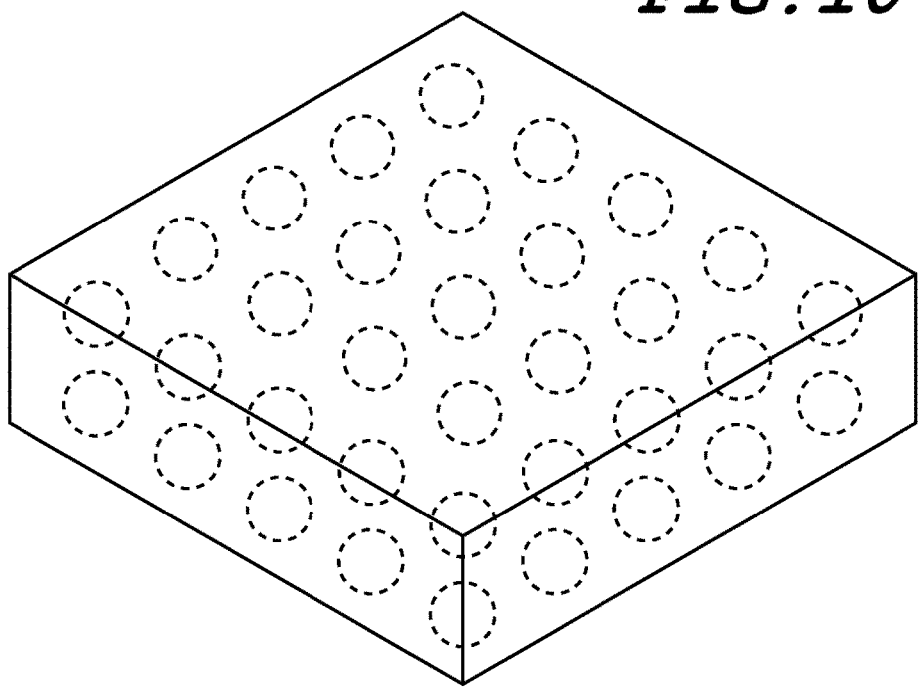
FIG. 10 is a drawing of the second layer of layered material printed with the hole on top of each hollow area printed in, according to an embodiment.

FIG. 10 is a drawing of the second layer of layered material printed with the hole on top of each hollow area printed in, according to an embodiment.

After the vacuum state is inducted, the holes on top of each hollow sphere is printed (filled in) and now the second layer is completed as illustrated in FIG. 10. All of the hollow areas (spheres or any other such shape) are subject to their own internal vacuum.

This process can be repeated for as many layers as needed. For example, the article illustrated in FIGS. 4A, 4B, and 4C can be printed using the timed vacuum induced printing method. Note that while FIGS. 7-10 show the layers being stacked one on top of the other (printed vertically from the bottom up), the layers can be printed vertically from the top down, or printed horizontally, etc. Note that all of the layers are integrally connected (attached), in other words the layers are all part of the same object and do not separate from each other.

One advantage of using the timed vacuum induced printing method is that the vacuum state does not need to be maintained for the entire printing of the article. This can save on resources such as power. When complex articles are printed (which may take a large amount of time), the timed vacuum induced printing method can be used to conserve resources.

In a further embodiment, the vacuum enclosure does not have to be printed inside a vacuum chamber but instead can be assembled inside a vacuum chamber. For example, an enclosure and a cap can be 3-D printed (without being in a vacuum chamber). Then, inside a vacuum chamber (of course subject a vacuum), the cap can be placed in the article thereby sealing the article. The hollow area inside the article would now be subject to a vacuum and the article (vacuum enclosure) can now be removed from the vacuum chamber. The article remains a vacuum enclosure because the hollow area of the article is completely sealed off from the outside environment and remained under a vacuum.

Figure 11:
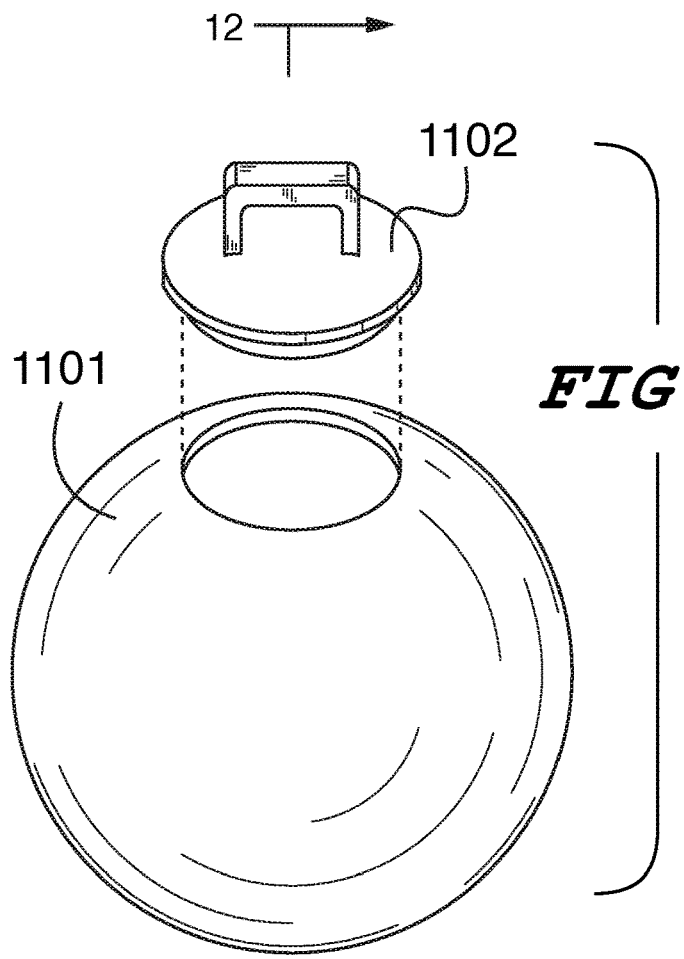
FIG. 11 is a drawing of a printed sphere enclosure and cap, according to an embodiment.
Figure 12:
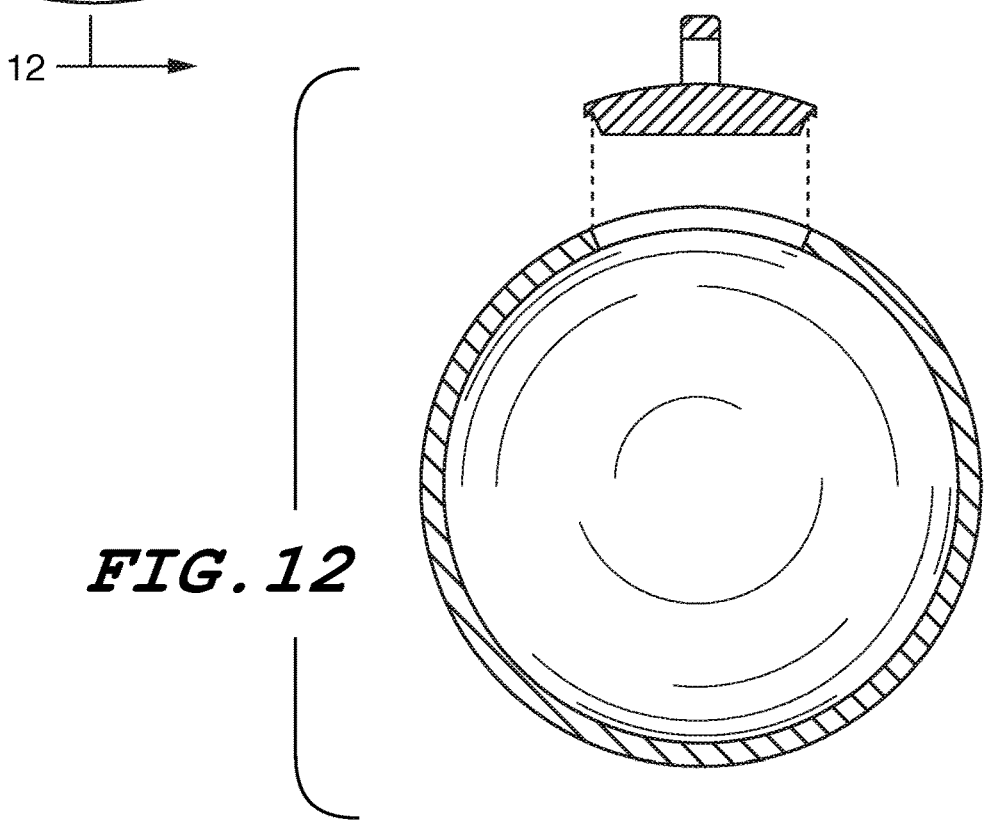
FIG. 12 is a cross-sectional view from the section plane indicated in FIG. 11 according to an embodiment.

FIG. 11 is a drawing of a printed sphere enclosure and cap, according to an embodiment. FIG. 12 is a cross-sectional view from the section plane indicated in FIG. 11 according to an embodiment;

A sphere 1101 has a cap 1102 that fits onto the sphere. Both the sphere 1101 and cap 1102 can be printed using a 3-D printer that is not in a vacuum chamber. The cap is configured to, when placed in an accommodating hole in the sphere, complete seal the contents of the sphere from the outside and maintain a vacuum state inside the sphere even after the sphere is removed from the vacuum chamber.

Figure 13:
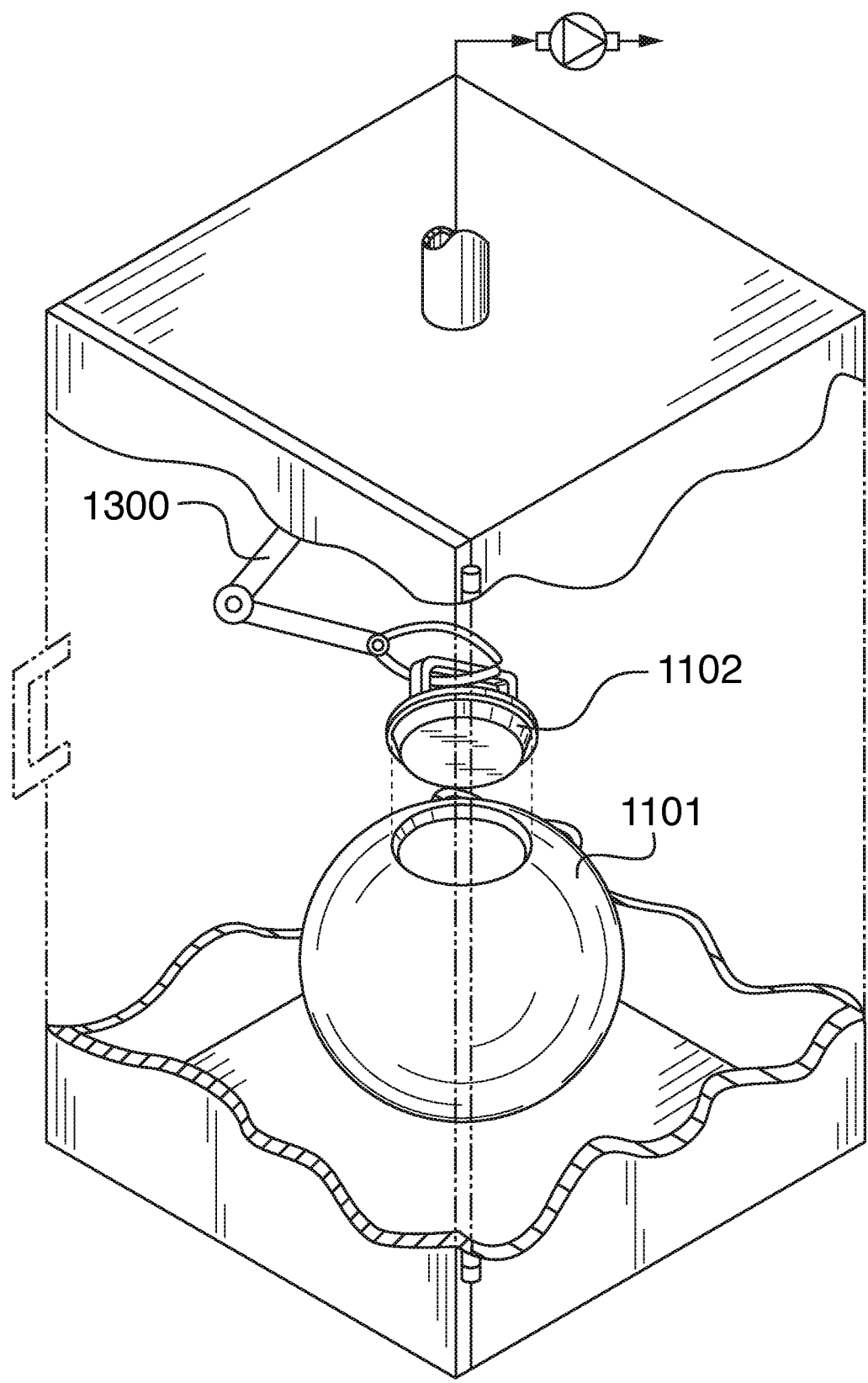
FIG. 13 is a drawing of assembling the sphere enclosure inside a vacuum chamber, according to an embodiment.

FIG. 13 is a drawing of assembling the sphere enclosure inside a vacuum chamber, according to an embodiment.

Note that a robotic arm 1300 places the cap 1102 onto the sphere 1101 thereby sealing the sphere. Since the vacuum chamber is in a vacuum state, the contents of the sphere 1101 is also in a vacuum state. The cap 1102 can fit and seal into the sphere 1101 by friction or the use of an adhesive can be used (e.g., glue, etc.) When the completed sphere 1101 is removed from the vacuum chamber, suction forces can maintain the seal between the cap 1102 and the sphere 1101.

Thus, in this embodiment, 3-D printing does not need to be performed inside a vacuum chamber, but the assembling of previously printed 3-D parts does need to be performed inside a vacuum chamber in order to manufacture a vacuum enclosure.

The method described herein can be applied to any type of enclosure (e.g., any size, shape, purpose of enclosure, etc.) The enclosure (when printing is complete) must have a sealed off hollow area (not exposed to the outside environment).

Figure 14:
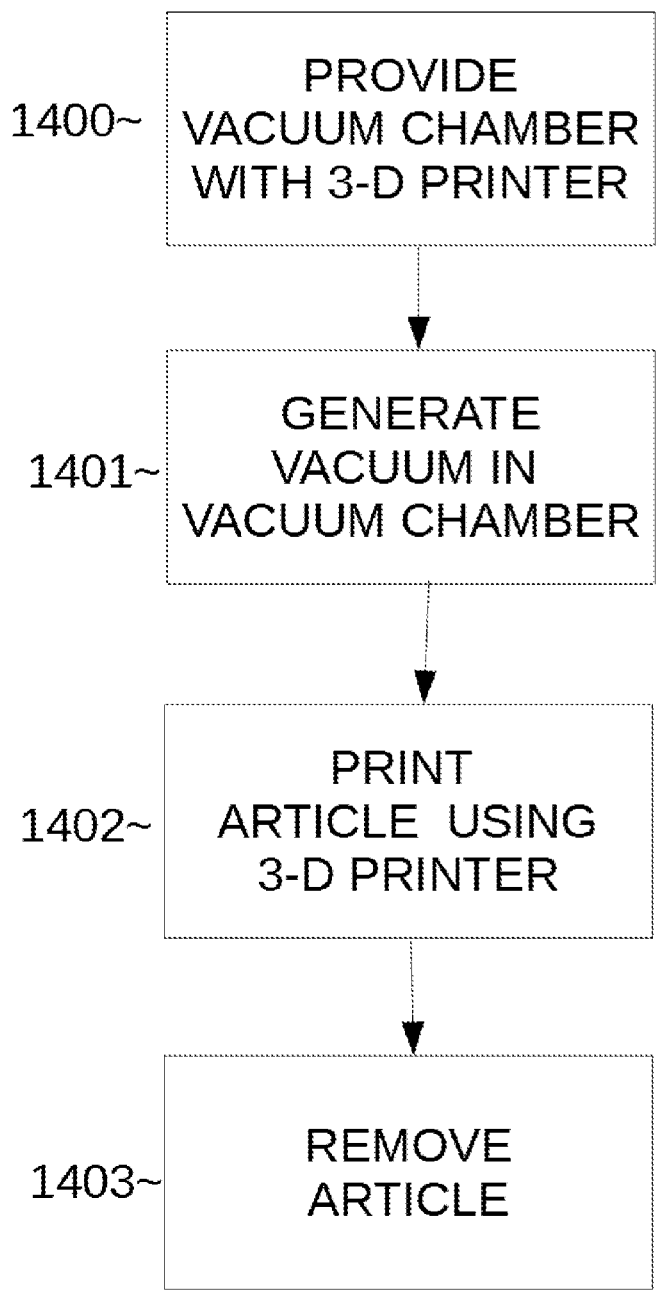
FIG. 14 is a flowchart illustrating an exemplary method of printing an article inside a vacuum chamber, according to an embodiment.

FIG. 14 is a flowchart illustrating an exemplary method of printing an article inside a vacuum chamber, according to an embodiment.

In operation 1400, a 3-D printer is provided, which can be any type of 3-D printer currently known in the art which can print any material known in the art which can be 3-D printed. The 3-D printer is placed inside a vacuum chamber, the vacuum chamber of course large enough to accommodate the 3-D printer. The 3-D printer may be controlled via a wireless connection so that the 3-D files to be printed to the 3-D printer can be transmitted wirelessly and the 3-D printer can also be controlled wirelessly. This obviates the need to open the vacuum chamber and thus destroying the vacuum environment in the vacuum chamber.

From operation 1400, the method proceeds to operation 1401, which generates a vacuum in the vacuum chamber. This can be accomplished by powering on the vacuum chamber, closing/sealing any doors to the vacuum chamber (so the vacuum chamber has no passage of air to the outside environment but for an air pump which is part of the vacuum chamber and removes air from the vacuum chamber), and waiting an amount of time (as set forth by the vacuum chamber manufacturer) before the vacuum inside the vacuum chamber is adequate (e.g., the parts per million of particles in the air is smaller than a predetermined threshold).

From operation 1401, the method proceeds to operation 1402, wherein the 3-D printer inside the vacuum chamber is commanded to print an article (e.g., any object which has one or more hollow areas which will be completely sealed off from the outside environment, for example see FIGS. 2-6 for some examples). This can be done by transmitting a 3-D printable file (e.g., STL or other format) to the printer along with a command to print. Numerous enclosures can be printed sequentially in operation 1402.

From operation 1402, the method proceeds to operation 1403, which removes the articles that were printed in operation 1402. Once all of the articles are completely printed, maintaining a vacuum environment inside the vacuum chamber is no longer necessary (because the hollow area inside each article will remain under a vacuum state) and thus the vacuum chamber can be re-pressurized and a door to the vacuum chamber can be opened and the printed article(s) can be removed.

In a further embodiment, the vacuum state inside the vacuum chamber does not need to be maintained throughout the entire 3-D printing of the article. Instead, most article inside the vacuum chamber can be 3-D printed without a vacuum state inside the vacuum chamber, and only before the final portion of the article is printed would the vacuum chamber be put into a vacuum state.

Figure 15:
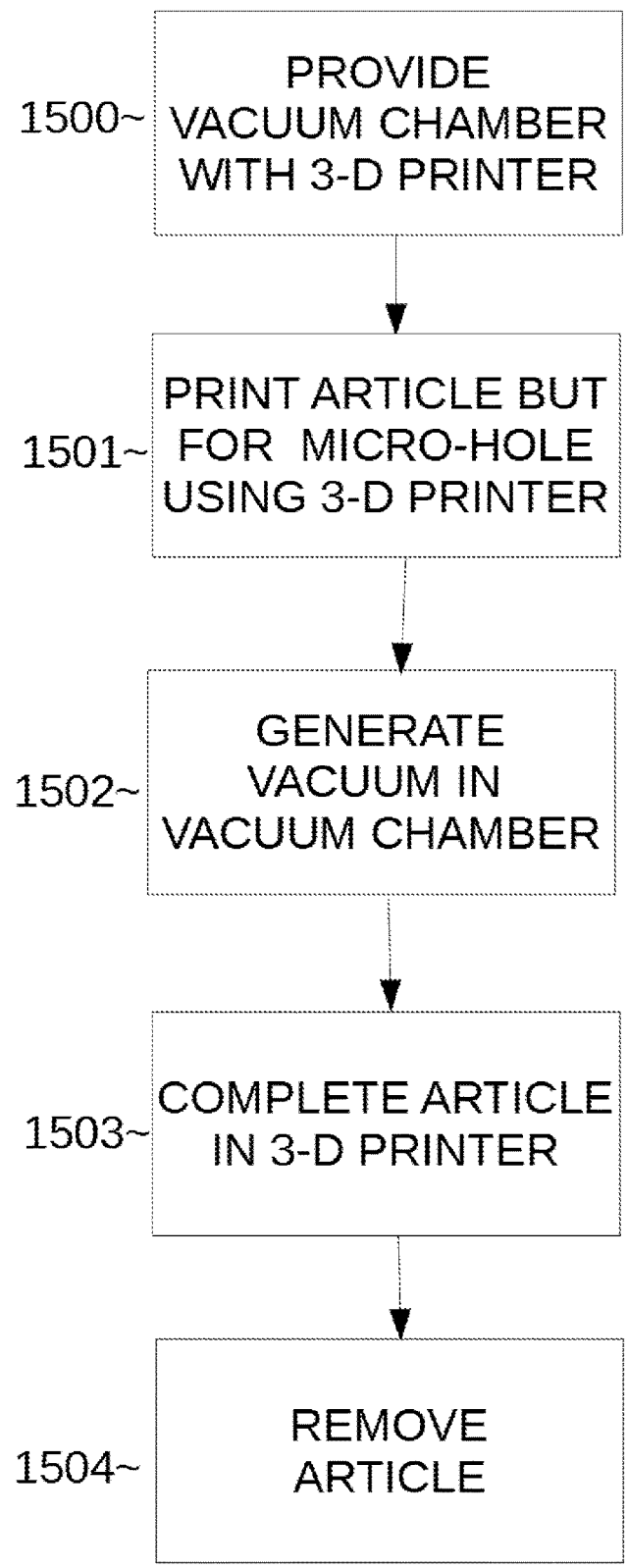
FIG. 15 is a flowchart illustrating another exemplary method of printing an article inside a vacuum chamber, according to an embodiment.

FIG. 15 is a flowchart illustrating another exemplary method of printing an article inside a vacuum chamber, according to an embodiment.

In operation 1500, a vacuum chamber with a 3-D printer inside is provided. This can be done as described with regard to operation 1400.

From operation 1500, the method proceeds to operation 1501 which prints most of the article but not the entire article. The entire article is printed by for a microhole (or any sized hole) on the surface (typically the top of the article) in which air can travel between the hollow area inside the article and the inside of the vacuum chamber. The hole or microhole can be any shape, such as round, square, etc. The 3-D printer is stopped after the article is mostly printed but before the microhole is filled in (printed). The microhole can be, for example, 1 millimeter in diameter (or any other size).

From operation 1501, the method proceeds to operation 1502, which generates a vacuum in the vacuum chamber. This can be done as described with regard to operation 1501. The vacuum pump is turned on and runs for a predetermined length of time to remove any off-gassing from the printing process and once the vacuum state inside the vacuum chamber has reached an acceptable level, then the method proceeds to operation 1103. Thus, when the vacuum state inside the vacuum chamber is maintained, all of the air is sucked out of the article being printed and a vacuum condition is maintained inside the article.

In operation 1503, the printing head resumes printing and now fills in (prints) the micro-hole. This operation occurs while the vacuum chamber now has a suitable vacuum state inside. Thus, this secures the vacuum state inside the article.

From operation 1503, the method proceeds to operation 1504, which removes the article. This can be performed as described with regard to operation 1503. The vacuum state inside the article remains even after the vacuum chamber is depressurized by virtue of the hollow area inside the article being completely contained (insulated from the outside environment).

While the method illustrated in FIG. 15 is similar to the method illustrated in FIG. 14, one advantage of the method illustrated in FIG. 15 is that the vacuum state does not need to be maintained during the entire 3-D printing process but only needs to be maintained when the micro-hole is printed (the article is completed). This may save resources by reducing the amount of time the vacuum chamber is operational (maintaining a vacuum state inside).

Note that the method illustrated in FIG. 15 would work for the articles (enclosures) illustrated in FIGS. 2A, 2B, 3A, 3B but not the article illustrated in FIG. 4A. This is because the article illustrated in FIG. 4A has multiple levels of hollow areas. For multi-layers articles, the method illustrated in FIG. 16 can be used.

Figure 16:
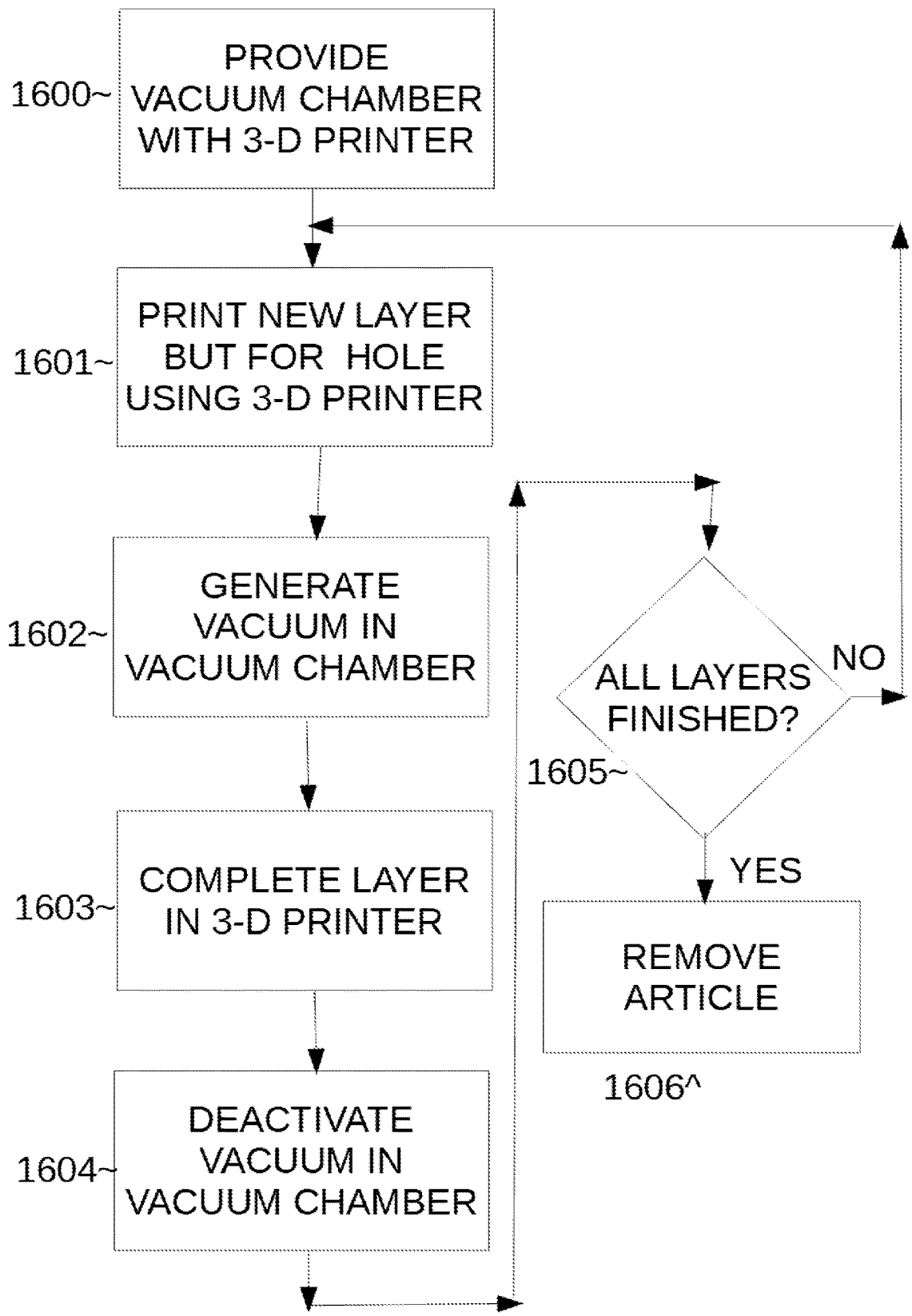
FIG. 16 is a flowchart illustrating an exemplary method of printing a multi-layer article using the timed vacuum induced printing method, according to an embodiment.

FIG. 16 is a flowchart illustrating an exemplary method of printing a multi-layer article using the timed vacuum induced printing method, according to an embodiment.

The method begins with operation 1600, which provides a vacuum chamber with a 3-D printer. This can be accomplished as described herein (e.g., see operation 1400).

From operation 1600, the method proceeds to operation 1601, which prints a new layer of hollow enclosures (or areas) but for the holes using the 3-D printer inside the vacuum chamber. The first time operation 1601 is executed the new layer would be considered the first layer (or bottom layer). This can be done as described herein (e.g., see operation 1501 and FIG. 7 (the first/bottom layer) and FIG. 8). An entire layer of multiple hollow areas (e.g., the 5×5 grid of hollow spheres shown in FIG. 7 or any other shape/configuration) will be printed up until a hole (or other opening) on the top of each hollow area. Note that each layer printed is printed on top of (or under or adjacent to, etc.) the previously printed layer (unless of course the current layer is the first layer) so that each layer printed is attached to the previous layer so the object printed is a contiguous object (subject to the hollow areas).

From operation 1601, the method proceeds to operation 1602, which generates (activates) a vacuum state in the vacuum chamber (and hence inside the 3-D printer). This can be done as described herein.

From operation 1602, the method proceeds to operation 1603, wherein the 3-D printer completes the current layer (printed in the last time operation 1601 was performed) by filling in the holes in the enclosures left in operation 1601. See for example FIG. 8 (the first/bottom layer) and FIG. 10 (the second layer). Each of the enclosures are now filled in and would be subject to their own internal vacuum state.

From operation 1603, the method proceeds to operation 1604, which deactivates the vacuum in the vacuum chamber. This can be done as described herein (e.g., by turning the power off to the pump). Note that when the vacuum chamber is activated and deactivated (in operations 1602 and 1604), these operations are typically performed automatically (e.g., by a computer program implementing the method) and not by a human manually turning the vacuum chamber on and off.

From operation 1604, the method proceeds to operation 1605, which determines whether all layers are printed (and hence the entire article is finished printing). If the last layer is being printed in operations 1601 and 1603, this last layer would complete the article being printed. If all layers are printed and hence the entire article is completed, then the method proceeds to operation 1606, wherein the completed article can be removed.

If in operation 1605, it is determined that all layers are not finished (there is more 3-D printing to be done), then the method returns to operation 1601 wherein the next layer can be printed.

Thus, when the object is completed (all layers are printed), it can be removed from the vacuum chamber. The object now has a plurality of internal hollow areas (e.g., spheres or other shapes) that are each subject to their own vacuum.

Note that there is no limit to the number of layers that can be printed using the method illustrated in FIG. 16. For example, an object can have 2-100 layers or more than 100 layers.

Figure 17:
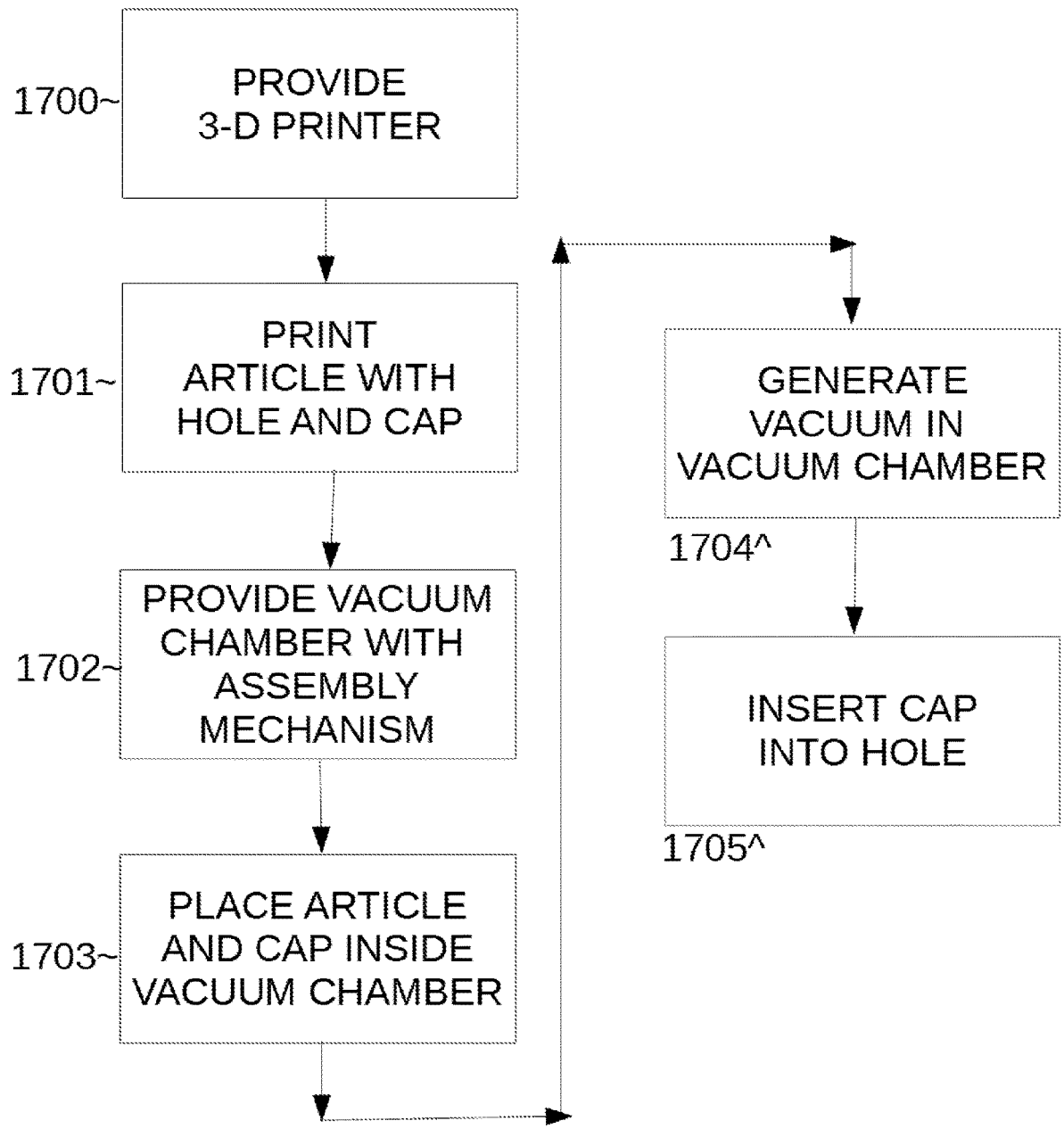
FIG. 17 is a flowchart illustrating an exemplary method of assembling an article inside a vacuum chamber, according to an embodiment.

FIG. 17 is a flowchart illustrating an exemplary method of assembling an article inside a vacuum chamber, according to an embodiment. FIG. 17 is the process illustrated in FIGS. 11-13.

In operation 1700, a 3-D printer is provided, which can be any type of 3-D printer currently known in the art which can print any material known in the art which can be 3-D printed.

From operation 1700, the method proceeds to operation 1701, wherein the 3-D printer is commanded to print an article with a hole inside it and a cap that is shaped to snugly fit inside the hole. This printing operation does not need to be performed inside a vacuum. The printing operation can print any number of such article(s) and corresponding cap (s). For example, see FIGS. 11-12 for an example of such an article (e.g., a sphere) with hole with a corresponding cap (which is shaped to fit snugly in the hole).

From operation 1701, the method proceeds to operation 1702, which then provides a vacuum chamber with an assembly mechanism. The assembly mechanism can be a robotic arm which can place the cap into the hole without requiring a human being to be present inside the vacuum chamber.

From operation 1702, the method proceeds to operation 1703, wherein the articles(s) and cap(s) printed in operation 1701 are placed inside the vacuum chamber.

From operation 1703, the method proceeds to operation 1704 which generates a vacuum in the vacuum chamber. This can be accomplished by powering on the vacuum chamber, closing/sealing any doors to the vacuum chamber (so the vacuum chamber has no passage of air to the outside environment but for an air pump which is part of the vacuum chamber and removes air from the vacuum chamber), and waiting an amount of time (as set forth by the vacuum chamber manufacturer) before the vacuum inside the vacuum chamber is adequate (e.g., the parts per million of particles in the air is smaller than a predetermined threshold).

From operation 1704, the method proceeds to operation 1705, which utilizes the assembly mechanism (e.g., robotic arm) to insert the cap into the hole in the article (see FIG. 9). In one embodiment, an adhesive (e.g., glue, can be used) to secure the cap inside the hole. In another embodiment, no adhesive is needed as the cap by virtue of its shape will snugly fit inside the hole via friction, and once the article is removed from the vacuum chamber the vacuum state inside the article will retain the cap on the enclosure via suction forces. In operation 1705 any number of caps can be inserted into their respective holes in respective articles (e.g., the method is not limited to assembling one such article at a time).

Utilizing the method illustrated in FIG. 17, in contrast to the method illustrated in FIGS. 14-16, 3-D printing inside the vacuum itself is not required. Note that in another embodiment, operations 1700-1701 can be replaced with any other manufacturing mechanism (e.g., the article and cap can be made using injection molding, subtractive printing, etc.)

Figure 18:
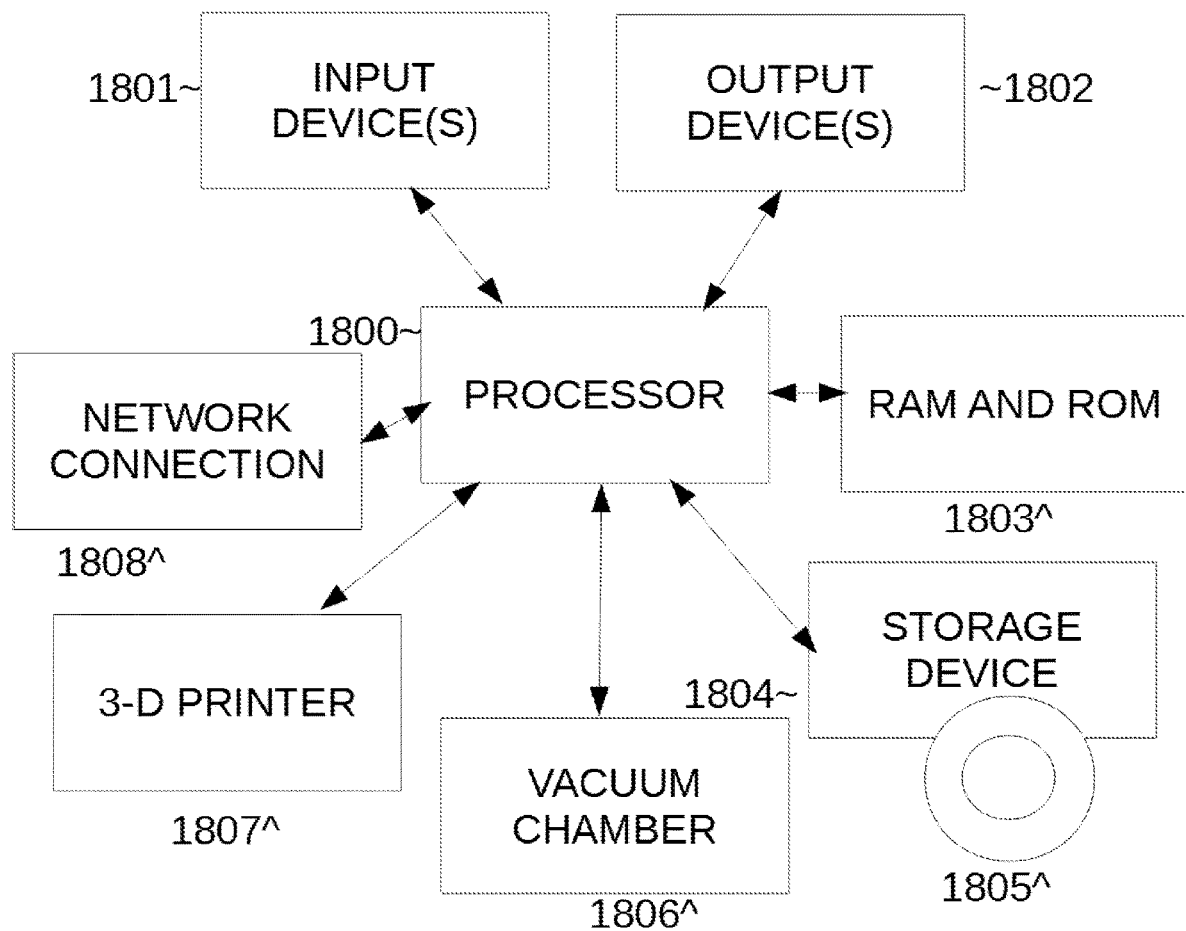
FIG. 18 is a block diagram illustrating hardware that can implement the operations described herein, according to an embodiment.

FIG. 18 is a block diagram illustrating hardware that can implement the operations described herein, according to an embodiment. A computer would typically be used to control the 3-D printer and to also control the vacuum chamber (e.g., turn it on, off, etc.) A single computer can be used for both or multiple computers can be utilized which communicate and cooperate with each other.

A processor 1800 (e.g., a microprocessor and any associated structure such as bus, cache, etc.) can be connected to one or more input devices 1801 such as a keyboard, touch-screen, mouse, buttons, etc. The processor 1800 can also be connected to one or more output devices 1802 such as an LCD, speaker, touch-screen, CRT, etc. The processor 1800 can also be connected to a RAM and ROM 1803 (shown as one block but can be two separate components). The processor 1800 can also be connected to a storage device 1804 such as an EPROM, hard disc drive, CD-ROM drive, flash memory, etc. The storage device 1804 can read a tangible non-transitory computer readable storage medium 1805 such as a hard disc, CD, etc. The processor 1800 can also be connected to a network connection 1808 which enables access to any computer network such as the Internet, LAN, WAN, Wi-Fi. Programs can be written (which can be stored on the ROM 1803, RAM 1803, storage device 1804, computer readable storage medium 1805, or any other computer readable storage device) which when executed by the processor 1800 would cause the processor 1800 to perform any of the methods described herein.

The processor 1800 can also be connected to a vacuum chamber 1806. The processor 1800 can control the vacuum chamber 1806 to turn it on (e.g., induce the vacuum state) and off (deactivate the vacuum state). In an embodiment, a sensor in the vacuum chamber 1806 can detect the concentration of air particles in the vacuum chamber 1806 so that only once the concentration of air particles is below a certain threshold would the processor then cause the 3-D printer to operate. In other words, if a vacuum state is required in the vacuum chamber the processor can monitor when the vacuum conditions inside the vacuum chamber are adequate and then can initiate printing on a 3-D printer 1807.

The processor 1800 can also be connected to the 3-D printer 1807. The processor 1800 can control when the 3-D printer actually prints so that if a vacuum state is required for printing the processor 1800 would wait until an adequate vacuum exists inside the vacuum chamber before printing. Of course, according to a program, if no vacuum state is required for a sequence of 3-D printing, then the processor would instruct the 3-D printer 1807 to print without a vacuum state being present inside the vacuum chamber 1806. The processor 1807 would transmit any files needed by the 3-D printer to print articles, stored in formats such as STL, VRML, etc. Thus, the processor 1800 can control both the vacuum chamber 1808 and the 3-D printer 1807 so that printing is done at the appropriate times (e.g., when there is or is not an acceptable vacuum state inside the vacuum chamber 1806) and can also instruct the 3-D printer 1807 to print any type of article as directed by a program. Note that while FIG. 18 illustrates the 3-D printer 1807 separate from the vacuum chamber 1806, in reality the 3-D printer 1807 would be located inside the vacuum chamber 1806 (as described herein).

In another embodiment, the 3-D printer 1807 and the vacuum chamber 1806 can be connected not directly to the processor 1800 but can be connected through a computer network which can then communicate with the processor 1800 via the network connection 1808. In other words the 3-D printer 1807 and the vacuum chamber 1806 do not need to be physically or directly connected to the processor 1800 for the system to function.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of printing an article, comprising:
providing a 3-D printer in a vacuum chamber;
printing with the 3-D printer a first layer of the article comprising a plurality of first hollow objects with a plurality of respective first holes, each of the first holes being located in a respective first hollow object;
forming a first vacuum state inside the vacuum chamber after printing the first layer while the plurality of respective first holes are not filled in;
filling in the plurality of first holes with the 3-D printer while in the first vacuum state;
deactivating the first vacuum state inside the vacuum chamber;
printing with the 3-D printer a second layer of the article comprising a plurality of second hollow objects with a plurality of respective second holes, each of the second holes being located in a respective second hollow object, the second layer being adjacent and attached to the first layer;
forming a second vacuum state inside the vacuum chamber after printing the second layer while the plurality of respective second holes are not filled in; and
filling in the plurality of second holes with the 3-D printer while in the second vacuum state.

2. The method as recited in claim 1, further comprising removing the article from the vacuum chamber.

3. The method as recited in claim 1, wherein the first hollow objects and the second hollow objects are spheres.

4. The method as recited in claim 1, further comprising:
deactivating the second vacuum state inside the vacuum chamber;
providing a printing sequence comprising:
A) printing with the 3-D printer a further layer of the article comprising a plurality of further hollow objects with a plurality of respective further holes, each of the further holes being located in a respective further hollow object, the further layer being attached to a previously printed layer;
B) forming a further vacuum state to be formed inside the vacuum chamber after printing the further layer;

C) filling in the plurality of further holes with the 3-D printer while in the further vacuum state;

D) deactivating the further vacuum state inside the vacuum chamber;

repeating the printing sequence N times, wherein N is greater than 1.

5. The method as recited in claim 4, wherein N is greater than 10.

6. The method as recited in claim 4, wherein N is greater than 50.

7. The method as recited in claim 4, further comprising removing the article from the vacuum chamber.

\* \* \* \* \*